United States Patent [19]

Urban

[11] 4,091,757
[45] May 30, 1978

[54] UNITIZED CAN MANUFACTURING SYSTEM

[75] Inventor: Joseph J. Urban, Pleasantville, N.Y.

[73] Assignee: Crown Cork & Seal Company, Inc., Philadelphia, Pa.

[21] Appl. No.: 749,296

[22] Filed: Dec. 10, 1976

[51] Int. Cl.$^2$ .............................................. B21D 51/26
[52] U.S. Cl. ...................................... 113/7 R; 113/27; 113/113 C; 113/120 R; 134/72
[58] Field of Search ................... 113/7 R, 7 A, 120 R, 113/120 A, 120 M, 113 C, 113 R, 114 C, 115, 27, 28, 29, 1 E, 1 F, 1 G; 134/48, 67, 68, 72–74; 15/60

[56] References Cited
U.S. PATENT DOCUMENTS

| | | | |
|---|---|---|---|
| 2,344,546 | 3/1944 | Krueger | 113/113 R |
| 3,079,936 | 3/1963 | Hockett et al. | 134/73 |
| 3,802,363 | 4/1974 | Longewis | 113/115 X |
| 3,815,535 | 6/1974 | Becker | 113/120 A |

Primary Examiner—Leon Gilden
Attorney, Agent, or Firm—Woodcock, Washburn, Kurtz & Mackiewicz

[57] ABSTRACT

A system for forming cans from metallic blanks, trimming them, and cleaning and drying the cans synchronously. An ironing, trimming and washing stage are connected in direct juxtaposition with one another, with no buffering conveyors therebetween. A single source of motive power operates all three stages through a common drive train. In the event of a jam in the ironing or trimming stages the drive is decoupled from the washing stage, and an auxiliary drive is engaged in order to continue the flow of cans through the cleaning stage until it is emptied. At this point the auxiliary drive may be disabled.

In a preferred embodiment a number of unitized stations are provided, each producing a synchronous flow of cans which are then accumulated through branches of a conveyor, and transported to a common site for printing.

15 Claims, 4 Drawing Figures

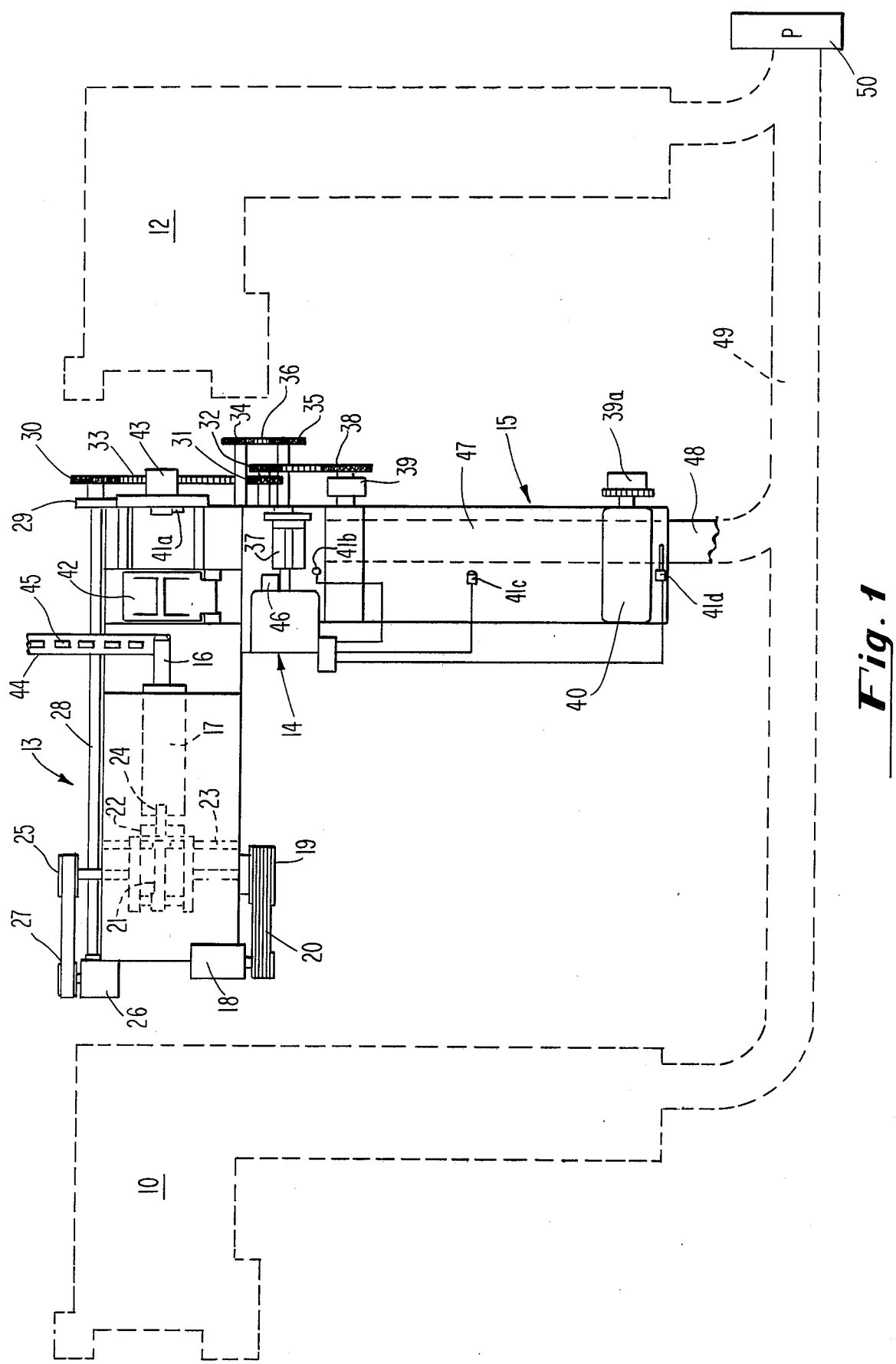

UNITIZED CAN MANUFACTURING SYSTEM

BACKGROUND OF THE INVENTION

The present invention relates generally to the manufacture of metallic containers, and more particularly to an integrated machine station for forming cans from metallic blanks and trimming and cleaning them.

Many different methods and apparatus for manufacturing metallic containers such as cans have long been known. In past years cans were typically of the "three piece" variety, i.e., a sidewall, and two separate end members. Such cans were formed by rolling flat stock into a hollow cylinder, forming and sealing an axial seam, applying and seaming a bottom end, then filling the container and applying a top. In recent years more and more cans of the drawn and ironed variety have been produced. Cans of this type are formed by drawing a disk-like blank into a shallow cup, then forcing the cup through a set of annular dies of decreasing diameter so that the cup is stretched and deepened to form a can. The lip about the open end of the can is typically irregular and ragged, and accordingly must be trimmed to form a regular upper edge, simultaneously sizing the height of the can. Finally, metal particles, lubricants and other foreign matter must be removed from the cans before printing or filling, and accordingly such cans are typically transported through elongate chambers where they are washed, rinsed with deionized water or the like, then dried and finally printed.

Despite advances in apparatus for forming the cans, such as for instance the draw-and-ironing machine disclosed in U.S. Pat. No. 4,007,620 issued Feb. 15, 1977, transportation of cans from one stage to another has continued to be a problem. In fact, more cans are damaged during transfer than during the actual processing or manufacturing operations. Although conveyors per se have been improved and newer forms thereof introduced, the basic approach to transporting numerous small articles, such as cans, has remained substantially the same. Cans produced by one stage are accumulated upon a conveyor, and fed to a subsequent stage. Each conveyor commonly provided buffering areas wherein cans could be accumulated in the event that a preceding stage produced more than could be accommodated by a succeeding stage. Such buffering areas absorb valuable floor space, necessarily increasing the overall size of the requisite manufacturing areas and moreover increasing the likelihood of damage to the cans.

Further, the apparatus used for cleaning newly-manufactured cans has typically taken the form of a tunnel-like flow through system wherein cans are transported through an elongate zone wherein they are progressively washed, and then dried. Conveyors having buffering areas are typically associated with either or both ends of the cleaning stage, further adding to the amount of space occupied by the apparatus.

From the foregoing, it will be understood that it would be highly advantageous to provide a unitized system for manufacturing cans, which eliminates the deficiencies of the usual prior art arrangements.

It is accordingly an object of the present invention to provide a unitized work station for manufacturing drawn and ironed can bodies.

Another object is to provide means for manufacturing cans, which occupies significantly less floor space than prior art apparatus.

Still another object is to provide a compact washer-dryer stage which may be used in direct juxtaposition with other manufacturing apparatus.

Another object is to provide a unitized can manufacturing station including a cleaning stage arranged in vertical tiers.

Yet another object is to provide a method of manufacturing metal cans which optimizes available floor space.

SUMMARY OF THE INVENTION

Briefly stated, in accordance with one aspect of the invention the foregoing objects are achieved by providing an ironing stage having a reciprocatory carriage and a ram and cooperating ironing die for forming blanks into rough cans. A trimming stage which operates in a known manner is coupled in direct juxtaposition to the ironing stage, and a cleaning stage disposed at the opposite side of the trimming stage from the ironer. A source of motive power is coupled to all three stages through a common power transmission system, whereby the stages are caused to operate in synchronism. Conventional sensors are used to detect the occurrence of jamming in the ironer or trimmer, and operate a clutch for decoupling the cleaning stage from the power transmission system. A separate, auxiliary drive is then engaged to empty the cleaning stage of the cans therein.

The cleaning stage advantageously comprises a plurality of horizontal conveyors, arranged vertically one above the other, and provided with meshing can-engaging fingers for carrying and transferring cans from a lower conveyor to the one thereabove. Water nozzles serve to flush impurities from the cans in the lower stages and heat is directed upon the cans in the uppermost stages, before the exit thereof.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 is an idealized plan view of a unitized station constructed in accordance with the present invention;

DESCRIPTION OF A PREFERRED EMBODIMENT

Figure 4:
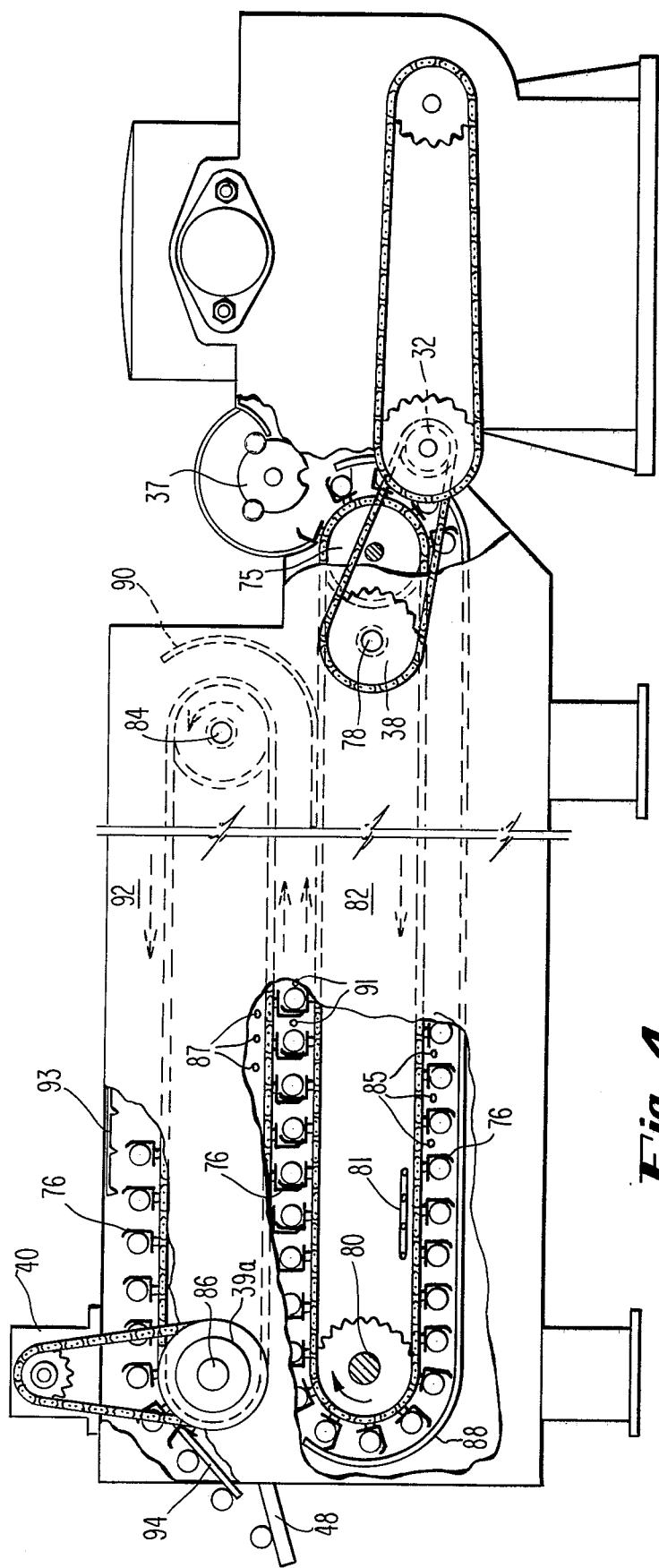
FIG. 4 is an elevation further illustrating the construction of a preferred embodiment.

FIG. 1 shows, in simplified form, a top or plan view of a can manufacturing system including several interlinked work stations 10, 11 and 12. Station 11 comprises three stages: an ironing stage 13, a trimmer 14 and a cleaning stage 15. In contrast to prior art approaches the stages are coupled in direct juxtaposition to one another and have no conveyors forming buffering areas therebetween. As will be discussed further, this is made possible by a unique drive system which allows the stages to be operated in synchronism with one another.

Ironer 13 includes a main frame and a ram 16 carried by a reciprocating carriage 17, as is familiar to those skilled in the art. While in the preferred embodiment a combination drawing and ironing apparatus of the type disclosed in U.S. Pat. No. 4,007,620 which issued on Feb. 15, 1977 was used, it is contemplated that other types of ironing apparatus may be adapted for use with the present invention. Further, while stage 13 is herein termed an "ironer" it will be recognized that such apparatus are occasionally constructed to perform both drawing and ironing steps. Accordingly, the term "ironer" should be recognized to indicate both ironing, and drawing and ironing, equipment. In the illustrated embodiment the ironing stage 13 is operated by a source of motive power 18, which may be a 60 horsepower electric motor. Motor 18 drives a pulley-flywheel 19 through a set of V-belts 20. A connecting rod 21 is journaled to pulley-flywheel 19, operating a lever 22 which rocks a pivot shaft 23 and therefore a second lever 24 which is in turn coupled to carriage 17. In this manner the rotation of pulley-flywheel 19 causes arms 22, 24 to oscillate thereby reciprocating carriage 17 along appropriate ways (not shown).

The shaft carrying pulley-flywheel 19 extends transversely through the ironer, carrying at the other end a drive pulley 25. A right-angle gearbox 26 is driven by a pulley 27 coupled to drive pulley 25 by means of an appropriate belt or chain. A drive shaft 28 extends from gearbox 26, being journaled at its distal end in a support 29, and carrying a drive sprocket 30. First and second driven sprockets 31, 32 are powered by drive sprocket 30 by means of a chain 33. The driven sprocket operates the cutting head of trimmer 14 by way of conventional gearing in the trimmer case.

Another sprocket 34 is carried by a shaft coupled to drive shaft 28 through a gear train or chain drive (not shown in the FIG.) and drives sprocket 35 through a chain 38. The latter mechanism serves to rotate a carrier 37 which carries cans through the trimmer in synchronism with their discharge from ironing stage 13.

Another driven pulley 38 is coupled to the internal drive system of cleaning stage 15 by way of a clutching mechanism 39. Clutch 39 is preferably of the three-position, electromagnetically engaged type. It is necessary for this clutch to be engageable in discrete, predictable positions so that the transfer system of the cleaning stage is in perfect synchronism with trimmer 14. In this manner, despite the repeated engagement and disengagement of the drive system cans will be transferred smoothly from one stage to the next. A second clutch 39a is also in driving communication with the system, the latter clutch serving to selectively couple auxiliary drive motor 40 to the drive system of the cleaning stage by means of a chain-and-sprocket drive which is only partially visible in FIG. 1. Sensors 41a–41d are coupled to the auxiliary motor and the first and second clutches in the manner to be described for selectively enabling or disabling portions of the drive system.

Returning to ironer 13, a set of annular dies of decreasing diameter are fixedly held within a die pack 42 and aligned with ram 16. A domer 43 is aligned with, a resiliently receives, the forward end of the ram when it has advanced to its outermost position.

Sensor 41a is coupled to the domer assembly in the conventional manner for detecting damaged cans. Ordinarily damaged or crushed cans will crumple ahead of the advancing ram so that the domer mechanism is depressed further than usual as the ram advances fully. The additional deflection or, equivalently the increased pressure, experienced by the domer is sensed by sensor 41a and a signal is produced to denote the presence of a damaged can.

A conveyor or the like 44 serves to bring metallic blanks 45 to the region of ram 16, wherein the ram engages the blanks as it advances. In the case of a combination drawing and ironing machine, blanks 45 may take the form of shallow metal cups. A combination-type machine will then sequentially draw the cups, then iron them into containers by forcing the cups through the dies of pack 42. Alternatively, blanks 45 may have previously been drawn into rough shape, whereupon after engagement by ram 16 they will be forced through the progressively smaller ironing dies to stretch them into the form of a closeended, cylindrical container. As the ram advances fully, it bottoms upon domer 43. As it retreats dogs, catches or similar means prevent the newly-formed can from following the ram, stripping it from the ram and allowing it to be transported directly to the trimmer 14.

The carrier 37 of trimmer 14 is provided with an appropriate chuck, which may be magnetic, or pneumatic. The chuck receives the newly-formed can and indexes it about. At an appropriate point the carrier stops and advances the can upon a mandrel 46, where it is trimmed by means familiar to those skilled in the art, such as cooperating shear rollers.

The presence of crushed, dented or otherwise defective cans is sensed by a second sensor 41b. The latter may be of any appropriate type, for instance a proximity detector which reacts to the presence of part of a can outside the ordinary path. Under normal circumstances this indicates a distorted or crushed can. The trimmed can is then removed from the mandrel and rotated about on carrier 37 to be discharged directly into cleaning stage 15 by a synchronously driven star wheel or the like.

As will be more fully discussed hereinafter, cleaning stage 15 is of unusually compact design owing to the vertical stacking of a plurality of horizontally-disposed conveyors therein. Cans entering the cleaning stage thus move back and forth as they are transported upwardly through the system by succeeding conveyors. The overlapping conveyor paths in the cleaning stage, generally indicated at 47, traverse washing and drying areas, the cans finally exiting along a branch 48 of a conveyor system. At an appropriate point or points within the cleaning stage a sensor 41c is positioned for detecting crushed or damaged cans, much in the manner of the sensing arrangement provided to the trimmer stage.

Another sensing mechanism 41d is disposed at or near the exit area of the cleaning stage. This mechanism, which may simply comprise a switch operated by an extending spring-biased arm, is maintained in a first state as the result of a continuous flow of cans out of the cleaning stage. When the flow of cans ceases the arm is allowed to drop and move the switch to its second state. Sensing mechanism 41d is coupled into the control mechanism in a manner to be discussed haereinafter for providing a signal. In the event of a jam or malfunction upstream of the cleaning stage, for instance in trimmer 14, an indication by switching means 41d that cans are still flowing from the cleaning stage will cause the system to keep the cleaning stage conveyors in operation despite the stoppage of the ironing and trimming stages.

In like manner cans manufactured in stations 10 and 12 are fed along corresponding branches to the trunk 49 of the conveyor system, whereby they are transferred to a printing apparatus 50. Typically trunk section 49 has more surface capacity than the minimum necessary to transport the cans produced, thus forming at least one buffering area in which newly-formed cans may be queued up awaiting transferral into printing apparatus 50. As is well known to those skilled in the art such queueing or buffering areas are used so that intermittently-supplied articles can be accumulated during periods when upstream apparatus are producing articles faster than they can be processed by subsequent, downstream apparatus.

Figure 2:
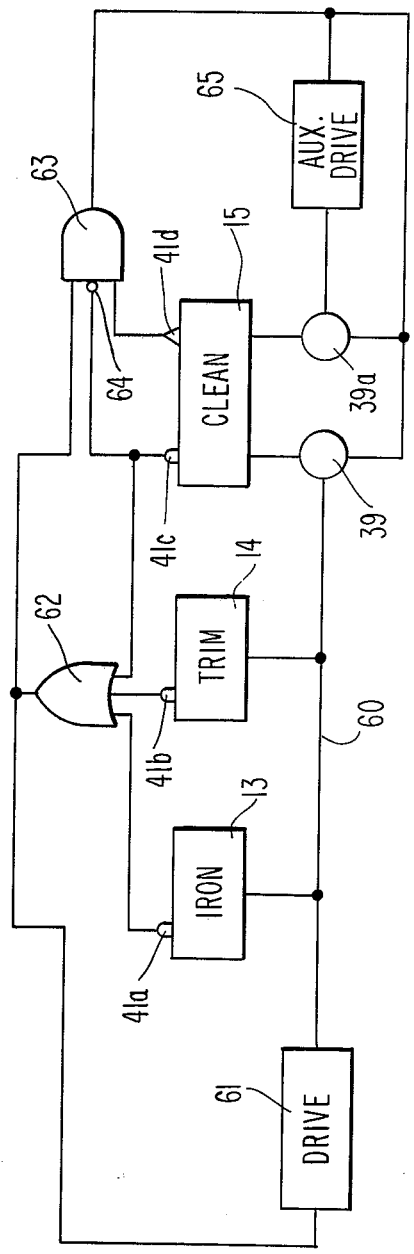
FIG. 2 is a schematic diagram illustrating one aspect of the control system of the invention.

Turning now to FIG. 2, there is shown in schematic form the control system for the unitized can-forming station described above. As in FIG. 1, the ironing, trimming and cleaning stages 13, 14 and 15 are operated through a common power transmission means 60 driven by a single source of motive power 61. Sensors 41a—41c are provided in or about the ironer, trimmer and cleaning stages. As is well known to those skilled in the art, such sensors are commonly used for detecting the presence of a distorted or jammed can body in the product flow path. Due to the close tolerances involved and the easily deformed nature of the product, jams occasionally occur wherein containers are crushed or deformed. Conventionally sensors such as those shown at 41a—41c respond to immediately disable the machinery, causing it to stop until the source of the malfunction can be located and corrected. So too with the present invention; when a jam or similar malfunction in the ironer, trimmer or cleaning stage is detected the appropriate sensor outputs a signal for disabling the source of motive power 61. In other embodiments the power source may simply be disconnected from the power transmission means 60. Such an option is, however, considered to be well within the capability of those skilled in the art.

In the functional diagrams shown, signals from the jam or faulty can sensors 41a—41c are OR'd together by means of an OR gate function 62 and transmitted to the primary drive 61 for removing the driving power from the various stages of the can forming system. At the same time the signal is applied to an AND gate function 63. A fault signal which arises within the cleaning stage 15 is also applied to the AND gate by way of an inhibit function generator, here depicted as an inverting terminal 64. A signal indicating the presence of cans in cleaning stage 15 is produced by sensor 41d. The output of AND gate 63 is coupled to auxiliary drive system 65 to energize the latter, and to clutch 39a to couple the auxiliary drive to cleaning stage 15. The enabling signal is inverted and applied to clutch 39 to decouple the cleaning stage from the primary drive system 60.

If a fault is sensed in the can forming system one of the sensors 41a–41c outputs a signal which traverses OR gate 62 and causes the principal drive 61 to shut down. The signal is also applied to AND gate 63 and fulfills one of the three conditions necessary for energization of the auxiliary drive system.

Should the detected fault lie in the cleaning stage 15 the signal produced by sensor 41c will serve to inhibit operation of the AND function as the operation of invert terminal 64 removes a preexisting enabling signal from the second input of the AND gate. In this event, all three stages of the system will remain disabled. If the fault lies in the iron or trim stages of the system, however, the absence of a signal from sensor 41c allows AND gate 63 to function.

In the event that cans are being processed by cleaning stage 15 when a fault occurs elsewhere in the system, the signal from sensor 41d which indicates the continued presence of cans will constitute the third necessary condition for enablement of the auxiliary drive system. Now the AND gate function 63 outputs a signal which starts the auxiliary drive motor which auxiliary drive 65 comprises, and at the same time actuates clutch 39a to allow the cleaning stage to be driven by auxiliary power. The signal is also applied to clutch 39 to disable the latter, thereby disengaging the cleaning stage from the primary drive system.

In the foregoing manner the ironing and trimming stages may be immediately disabled in the presence of a jam or similar malfunction, while the cleaning stage of the system continues to operate. When all of the cans present within the cleaning stage 15 are exhausted sensor 41d changes state, disabling clutch 39a and the auxiliary drive system. Thus, despite the earlier disablement of a portion of the can forming station newly-formed cans will not be retained within the cleaning stage but will be transported therethrough in the normal fashion. This avoids detrimental effects to the cans which may occur, for instance, due to the elevated temperatures at which the cans are dried. The present system assures that cans will be transported through the cleaning stage at the regular rate, despite the disablement or failure of segments of the system upstream from the cleaning stage. At the same time the control serves to operate the various stages of the manufacturing system in synchronism so that the usual buffering areas, and accompanying conveyors and the like, do not have to be interposed between various stages. Since the stages operate in synchronism with one another cans may be passed directly from one stage to the next. In some instances, depending upon the specific configuration of the machinery, it is contemplated that extremely short conveyor elements may be called for to shuttle cans from one stage to the next. However, the stages must still be regarded as being in direct juxtaposition to one another inasmuch as such short conveyor segments provide for no accrual or buffering areas, but rather require that cans be received by each stage at the same rate as they are produced by preceding stages. At the same time the disadvantages which would ordinarily inhere in synchronous stages, i.e., the need to disable all stages if a malfunction occurs anywhere in the product flow, is overcome by the control system.

Figure 3:
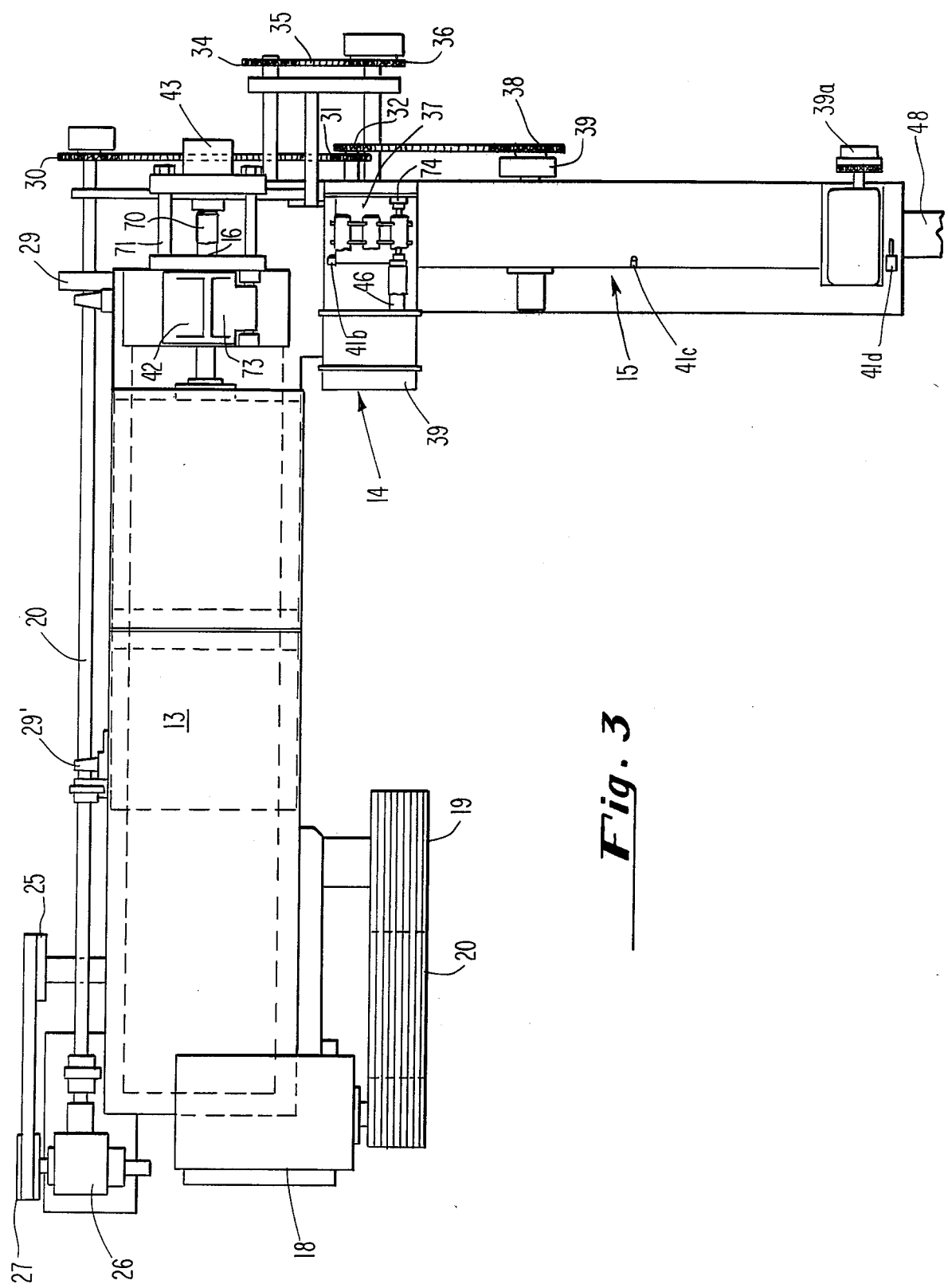
FIG. 3 is a plan view showing in detail the construction of a station.

Turning now to FIG. 3 there is shown in detail a top or plan view of a preferred embodiment of the subject can manufacturing station. A single 60 horsepower motor 18, which forms the source of motor power for the synchronous assembly, drives a pulley-flywheel 19 through a set of V-belts 20. At the far side of the machine a drive pulley 25, which is mechanically coupled to the pulley-flywheel 19, operates right-angle gearbox 26 through driven pulley 27. The gearbox may be of any appropriate type, commonly including a set of 90° bevel gears so that power is supplied to an output shaft lying at substantially right angles to the pivotal axis of pulley 27. The gearbox is coupled through an output shaft 20 to a sprocket 30, the shaft being journaled in bearings 29, 29'. A chain 33 then transmits the power thus developed to trimmer stage 14 by way of driven sprocket 31, and to cleaning stage 15 by sprocket 32 which is coupled directly to sprocket 31. An output shaft of the trimmer drives sprocket 36 by way of chain 35 and drive sprocket 34 for operating the can-carrying rotating head 37 of the trimmer.

While the reciprocating carriage within ironer 13 is not visible, ram 16 is shown in its fully extended position, and bearing a newly-formed can 70 thereon. In the position shown the nose of ram 16 extends into a domer 43, which includes a receiving portion contoured to match the nose of the ram and impart a depression into the closed end of can 70. The domer 43 is rigidly attached to die pack 42, and to the frame of the machine, by threaded shafts 71, 72. The die pack which supports the various die rings through which ram 16 penetrates advantageously is provided with a hinged lid 73 for providing easy access to the rings, and facilitating the adjustment and replacement.

As ram 16 retreats through die pack 42 the newly-formed can is stripped from the ram end whereupon it is received by a suitable transfer mechanism, which may be a short slide or a star wheel. The open ends of the cans are ragged and irregular, due to the nature of the ironing process. In order to square off the ends the cans are transferred directly into trimmer stage 14 which is in direct juxtaposition to ironer 13, substantially as shown. Head 37, bearing a chuck 74, then sequentially engages the cans by their closed (bottom) end. The head indexed around until the can is aligned with mandrel 46, whereupon chuck 74 extends forwardly and thrusts the can over the mandrel. The can is then rotated in engagement with a shear wheel (not shown) which shears the irregular open end from the mouth of the can, and at the same time reduces the can to the proper height.

By a judicious selection of gear ratios for gearbox 26 and pulley sizes, the operation of trimmer 14 is brought into precise synchronism with the operation of ironer 13. Accordingly, no excess cans need be accumulated or queued up for the trimmer stage, and cans formed by ironer 13 can be passed directly to the trimmer as quickly as they are made. It will be understood that in order to properly form thin-walled cans from incoming metallic blanks, the clearance between ram 16 and the ironing dies within die pack 42 is extremely small. Further, the thin-walled cans are easily deformed and occasionally become jammed in the forming apparatus and/or the trimming mechanism. For this reason it is necessary to provide means for disabling the mechanism until a jam can be cleared. Otherwise ram 16 would continue to reciprocate and head 37 to rotate, possibly damaging the can-forming apparatus or the drive system.

Cleaning stage 15 is driven by means of a sprocket 38 which is chain-linked to a driven sprocket 32. As set forth above, the latter is coupled to the shaft upon which pulley 31 revolves so that the cleaning stage is driven by the same source of motive power as are the preceding stages. As will be discussed hereinafter the cleaning stage comprises a vertically-arranged series of horizontal conveyors, each bearing a plurality of can-receiving pockets, whereby each can is individually grasped and transported in spaced relationship to the others. A sensor 41d, which may be a photoelectric cell, proximity detector, or switch-actuating arm, is placed near the exit of the cleaning stage and is responsive to the continued presence of conveyed cans to keep an auxiliary drive system inoperative.

When a jam or similar malfunction develops, causing sensors 41a or 41b to disable the main drive system of the can manufacturing station, a signal is produced for decoupling cleaning stage 15 from the power transmission system. If cans are still present in the cleaning stage, transducer 41d outputs a signal reflecting their presence to allow the auxiliary drive 39 to be energized and the cleaning stage decoupled from the main drive. The auxiliary drive is then coupled into the system by means of clutch 39a and operates the cleaning stage 15. In this manner the cleaning stage continues to operate despite the stoppage of the ironer and trimmer stages. The cleaning stage will continue to operate until all of the cans therein are transported out of the stage, at which time the continued absence of cans flowing from the cleaning stage causes the sensor 41d to change its state and cause the auxiliary drive motor to be deenergized. The entire system is then disabled and remains so until re-started. When re-started the auxiliary drive system including clutch 39a are in a disabled state, such that the ironing, trimming and cleaning stages once again operate in synchronism.

Clutch 39a need not be of any specific type and may be of the frictionally-engaged variety since, while operating under auxiliary power, cleaning stage 15 is not in synchronism with the balance of the can forming system. Further, in some applications it may be desirable to have auxiliary motor 40 operating constantly so that the auxiliary drive can be implemented simply by operating clutch 39a. In this case clutch 39a should be of the overrunning type.

On the other hand clutch 39, which couples the cleaning stage to the main drive system, must operate the cleaning stage in proper relationship to the other elements of the can forming system. For this reason clutch 39 should be of the positive-engaging type, adapted to secure the driving and driven elements thereof together in a predetermined relationship to one another. In a preferred embodiment a 3-position toothed clutch of the electromagnetically-engaged type is used.

FIG. 4 is an elevational diagram of the station, as viewed from the right side of FIG. 3. Portions of the system are broken away to better allow the power transmission system to be shown. The rotating head 37 of the trimmer stage is indicated, and bears three pockets substantially 120° apart for receiving newly-formed cans in the manner described above. Cans ejected from the trimmer apparatus are transferred to the cleaning stage by a sprocket 75 with a moving carrier having sets of resilient fingers 76 which engage each can. The conveyor extends substantially horizontally and is driven by sprockets or the like journaled upon horizontal shafts 78, 80. In the illustrated embodiment the conveyor operates in clockwise fashion so that cans received from the trimmer stage are carried about the lowermost or inverted side of the conveyor into a washing zone generally indicated at 82. A plurality of sets of upper nozzles 81 are provided above the locus of travel of the cans. Pressurized water from the nozzles is thus caused to impinge upon substantially the entire circumference of the can body. Further, other nozzles 85 are directed axially inwardly so as to direct water into the horizontally-located cans. Cans thus traverse the washing zone 82 in substantially linear fashion, exiting at the leftward end thereof and being carried upwardly and then to the right in accordance with the travel of the conveyor. Vertically disposed above the first conveyor is a second conveyor, also disposed horizontally and powered by sprockets or the like journaled upon shafts 84, 86. This second conveyor turns in a counterclockwise manner so that the finters 76 therein interleave with corresponding can-receiving fingers of the lower conveyor. The interleaving is best illustrated where the conveyors first mesh, in the area between shafts 80 and 86. Rails 88, 90 extend about the ends of the conveyor and aid in keeping the cans in the desired location. The cans, now captured between the interleaved fingers continue horizontally to the left under additional upper sets of nozzles 87. These nozzles direct rinsing water about the surfaces of each can. Other, horizontal nozzles 91 direct water axially inwardly of the passing can to thoroughly rinse the inner surfaces thereof. Finally, at the rightward end of their travel additional nozzles direct deionized water about and within the passing cans.

At the rightward end of the middle run the upper and lower conveyors separate the can-engaging fingers disengaging from one another. Due to the construction of the fingers and the presence of guide rail 90 the cans are disengaged from the lower sets of fingers but retained by the fingers of the uppermost conveyor so that the cans are carried upwardly, then to the left along the uppermost horizontal run of the system. The uppermost run comprises a drying zone 92. The drying zone advantageously includes means such as nozzles 93 for supplying heated air to the cans. Resistive, infrared or other heat sources, long familiar to those skilled in the art, may be located in drying zone 92 for evaporating deionized water from the cans. Alternatively, it is well within the capabilities of those skilled in the art to provide means for heating air at a remote location, then directing the heated air into the drying zone for drying the passing cans.

As the cans reach the leftward end of the drying zone they are released from fingers 76 and ejected from the cleaning stage. The ejected cans will roll down an exit chute 94 or may be engaged by star wheels, conveyors, or the like for transporting them to a printer stage (not shown).

From FIG. 4 it will be apparent that cans received by the cleaning stage traverse a vertical sinuous path inasmuch as the cans are transported first in a horizontal direction, then arcuately upwardly to a succeeding horizontal run, etc. until the final, uppermost run is traversed. In this manner the succeeding stages are stacked vertically one above the other so that an extremely compact apparatus is attained. All of the necessary processing of the newly-manufactured cans is accomplished in a far smaller space than is required for present equipment.

It is contemplated that the various conveyor driving shafts 78, 80, 84 and 86 of the cleaning stage are coupled together so that the upper and lower conveyors operate at the same rate of speed and in the desired relationships with one another. Accordingly, by applying driving power to one of the shafts the entire stage can be operated.

As set forth above, power for driving the cleaning stage is ordinarily obtained by means of a chain drive between sprocket 32, connected to the trimming stage, and sprocket 38 which is drivingly connected to driving shaft 78 by means of a three position electromagnetic clutch 39 (not visible in the Figure). When a malfunction occurs in the ironing or trimming stage, clutch 39 is disengaged by the afore-described control system so that shaft 78 can essentially "free wheel".

With auxiliary motor 40 energized and clutch 39 engaged, driving power is now applied to the cleaning stage via shaft 86 until all cans are discharged.

The advantages of the present system are manifold. A very substantial saving in factory space is achieved by the extremely compact configuration of the manufacturing station. In a typical layout, a successfully-tested embodiment of the invention occupied only 50% of the space previously required to accomplish the same operations. The time required to form and process cans was estimated to be 40–60% less than with prior art apparatus, and moreover an approximate 50% saving in energy is achieved due to the efficient use of motive power. At the same time, and despite the extremely compact design of the apparatus, in-process cans will not be trapped and damaged in the final stage despite disabling malfunctions which may occur in prior stages of the apparatus. Accordingly, the control system allows cans to be fully exhausted from the apparatus before it is fully disabled, thus "clearing" the cleaning stage while the can-forming apparatus lies disabled.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Apparatus for manufacturing cans from metal blanks, comprising:
    an ironing stage having a reciprocatory carriage and a ram carried thereby and including an ironing die for receiving a metal blank carried by said rams;
    a trimming stage coupled in direct juxtaposition to said ironing stage for sequentially receiving newly-formed containers and trimming the open ends thereof in synchronism with the operation of said ram;
    a cleaning stage coupled in direct juxtaposition to said trimming stage for sequentially receiving and discharging newly-trimmed containers;
    a primary drive means;
    power transmission means mechanically coupling said drive means to said ironing, trimming and cleaning stages to operate all of said stages in synchronism with one another;
    sensor means for detecting a discontinuity in the flow of cans to said cleaning stage; and
    disconnect means actuated by said sensor means for removing motive power from said ironing and trimming stages;
    whereby cans are transferred directly and at identical rates from one stage to the next, without the presence of conveyor buffering areas.

2. Apparatus according to claim 1, further including second sensor means for detecting the presence of cans within said cleaning stage;
    a second auxiliary drive means; and
    means for mechanically coupling said auxiliary drive means to said cleaning stage in response to the discontinuance of motive power to said ironing and trimming stages for operating said cleaning stage at least until all cans are discharged therefrom.

3. Apparatus for manufacturing cans from metal blanks, comprising:
    an ironing stage having a reciprocatory carriage and a ram carried thereby and including an ironing die for receiving a metal blank carried by said ram;
    a trimming stage coupled in direct juxtaposition to said ironing stage for sequentially receiving newly-formed containers and trimming the open ends thereof in synchronism with the operation of said ram;

a cleaning stage coupled in direct juxtaposition to said trimming stage for sequentially receiving and discharging newly-formed cans;

a primary drive means;

power transmission means mechanically coupling said drive means to said ironing, trimming and cleaning stages to operate all of said stages in synchronism with one another;

sensing means for indicating the cessation of output of cans from said trimming stage; and means coupled to said sensor and responsive thereto for drivingly coupling said cleaning stage to said power transmission means only when cans are outputted by said trimming stage;

whereby cans are transferred directly and at identical rates from one stage to the next, without the presence of conveyor buffering areas.

4. Apparatus according to claim 3, further including a second, auxiliary drive means;

means for selectively coupling said auxiliary drive means to said cleaning stage only when said cleaning stage is decoupled from said power transmission means.

5. Apparatus according to claim 3, wherein said means for coupling comprises an electromagnetic clutch engageable in discrete positions.

6. Apparatus according to claim 3, further including means for disengaging said cleaning stage from said power transmission means in response to the cessation of flow of cans through said ironing and trimming stages.

7. Apparatus for manufacturing cans from metal blanks, comprising:

an ironing stage having a reciprocatory carriage and a ram carried thereby and including an ironing die for receiving a metal blank carried by said ram;

a trimming stage coupled in direct juxtaposition to said ironing stage for sequentially receiving newly-formed containers and trimming the open ends thereof in synchronism with the operation of said ram;

a cleaning stage coupled in direct juxtaposition to said trimming stage for sequentially receiving newly-trimmed containers and including a plurality of horizontally-disposed endless conveyors oriented vertically one above the other to define a vertical sinuous path, said conveyors including can receiving means for each can, said can receiving means on adjacent conveyors interleaving to transfer cans from one conveyor to the next, said cleaning stage further including means for directing pressurized water about both the inside and outside surfaces of the cans and for substantially drying the cans before their discharge;

a primary drive means;

power transmission means mechanically coupling said drive means to said ironing, trimming and cleaning stages to operate all of said stages in synchronism with one another;

whereby cans are transferred directly and at identical rates from one stage to the next, without the presence of conveyor buffering areas.

8. Apparatus as defined in claim 7, wherein said conveyor means comprises a plurality of horizontal conveyors disposed one above the other for sequentially transporting cans in alternate directions along parallel horizontal paths.

9. Apparatus according to claim 8, wherein said cleaning apparatus comprises a plurality of nozzles for directing water upon said cans along at least the lowermost of said horizontal paths, and means for directing heated air against said cans along at least said uppermost of said horizontal paths.

10. Apparatus according to claim 9, wherein said washing nozzles are arranged to provide contact of pressurized water about the full circumference of said cans, both inside and out.

11. A system for mass producing cans from metal blanks and comprising a plurality of stations, each station including:

an ironing stage having a reciprocatory carriage and a ram carried thereby including an ironing die for receiving a metal blank carried by said ram;

a trimming stage coupled in direct juxtaposition to said ironing stage for sequentially receiving newly-formed containers and trimming the open ends thereof in synchronism with the operation of said ram;

a cleaning stage coupled in direct juxtaposition to said trimming stage for sequentially receiving newly-trimmed containers from said trimming stage and including conveyer means defining a vertical sinuous path therein;

a plurality of motive power sources, one associated with each of said stations;

power transmission means disposed in each of said stations for mechanically coupling the respective power source to said ironing, trimming and cleaning stages for operating all of said stages in synchronism with one another;

an elongate conveyer means having a branch extending to each of said stations, said branches connecting in a main trunk, said trunk connecting to said can printing apparatus;

auxiliary drive means; and coupling means for selectively coupling said auxiliary drive means to said cleaning stage in response to the disconnection of an associated motive power source.

12. A system according to claim 11, wherein each of said power transmission means includes clutch means for disconnecting the associated motive power source in response to a jamming of said ironing or said trimming stages.

13. A system according to claim 11, further including clutch means associated with said power transmission means for drivingly coupling said cleaning stage to said motive power source when cans are outputted by said trimming stage.

14. A system according to claim 13, further including means for disengaging said clutch means in response to a jamming of newly-manufactured cans.

15. A system for mass producing cans from metal blanks and comprising a plurality of stations, each station including:

an ironing stage having a reciprocatory carriage and a ram carried thereby including an ironing die for receiving a metal blank carried by said ram;

a trimming stage coupled in direct juxtaposition to said ironing stage for sequentially receiving newly-formed containers and trimming the open ends thereof in synchronism with the operation of said ram;

a cleaning stage coupled in direct juxtaposition to said trimming stage for sequentially receiving newly-trimmed containers from said trimming stage and including a verticallyarranged group of horizontally-disposed endless conveyers, each of said conveyers having thereon a plurality of means for receiving individual cans, said means for receiving of juxtaposed conveyer means interleaving to effect the transfer of cans from a lower conveyer to an upper one;

a plurality of motive power sources, one associated with each of said stations;

power transmission means disposed in each of said stations for mechanically coupling the respective power source to said ironing, trimming and cleaning stages for operating all of said stages in synchronism with one another; and an elongate conveyer means having a branch extending to each of said stations, said branches connecting in a main trunk, said trunk connecting to said can printing apparatus;

whereby cans are formed and transferred directly from one stage to another, without the presence of conveyer buffering areas within any of said stations.

* * * * *